United States Patent
Ahuja et al.

(10) Patent No.: US 10,218,730 B2
(45) Date of Patent: Feb. 26, 2019

(54) SYSTEMS AND METHODS OF STATELESS PROCESSING IN A FAULT-TOLERANT MICROSERVICE ENVIRONMENT

(71) Applicant: ShieldX Networks, Inc., San Jose, CA (US)

(72) Inventors: Ratinder Paul Singh Ahuja, Saratoga, CA (US); Manuel Nedbal, Santa Clara, CA (US)

(73) Assignee: ShieldX Networks, Inc., San Jose, CA (US)

(*) Notice: Subject to any disclaimer, the term of this patent is extended or adjusted under 35 U.S.C. 154(b) by 267 days.

(21) Appl. No.: 15/224,385

(22) Filed: Jul. 29, 2016

(65) Prior Publication Data
US 2018/0034839 A1 Feb. 1, 2018

(51) Int. Cl.
*H04L 29/06* (2006.01)
*H04L 12/24* (2006.01)
*H04L 29/08* (2006.01)

(52) U.S. Cl.
CPC ...... *H04L 63/1425* (2013.01); *H04L 41/0668* (2013.01); *H04L 63/1408* (2013.01); *H04L 63/20* (2013.01); *H04L 67/142* (2013.01); *H04L 67/16* (2013.01)

(58) Field of Classification Search
CPC . H04L 63/14; H04L 63/1425; H04L 63/1441; H04L 63/1408; H04L 63/1416; H04L 63/20; H04L 63/08; H04L 67/142; H04L 67/16
See application file for complete search history.

(56) References Cited

U.S. PATENT DOCUMENTS 8,498,301 B2 * 7/2013 Kwon ................. H04L 41/5041
370/400
9,083,605 B2 * 7/2015 Banavalikar ............ H04L 45/00

OTHER PUBLICATIONS

International Search Report and Written Opinion for Application No. PCT/US2017/044349, dated Sep. 20, 2017, 9 pages.
(Continued)

*Primary Examiner* — Hadi S Armouche
*Assistant Examiner* — Shaqueal D Wade
(74) *Attorney, Agent, or Firm* — Nicholson De Vos Webster & Elliott, LLP

(57) ABSTRACT

A system, method, and non-transitory computer-readable relating to network security are disclosed. In particular, embodiments described generally relate to systems and methods of stateless processing in a fault-tolerant microservice environment. In one example, a method is disclosed, which includes transmitting, by a first microservice, packet data and a context associated therewith; receiving the packet data and the context by a second microservice, the second microservice to: use the context to determine what security processing to perform, perform the security processing over the packet data, and transmit resulting data and the context to a third microservice; and receiving the resulting data and the context by the third microservice, the third microservice to: use the context to determine what security processing to perform, and perform the security processing over the resulting data.

17 Claims, 9 Drawing Sheets

(56) References Cited

OTHER PUBLICATIONS

Kim S., et al., "High-Assurance Synthesis of Security Services from Basic Microservices," Proceedings of the 14th International Symposium on Software Reliability Engineering, ISSRE, Nov. 17, 2003, pp. 154-165.
Safina L., et al., "Data-Driven Workflows for Microservices : Genericity in Jolie," 2016 IEEE 30th International Conference on Advanced Information Networking and Applications, Mar. 23, 2016, pp. 430-437.
Sun Y., et al., "Security-as-a-Service for Microservices-Based Cloud Applications," IEEE 7th International Conference on Cloud Computing Technology and Science (CLOUDCOM), Nov. 30, 2015, pp. 50-57.

\* cited by examiner

US 10,218,730 B2

SYSTEMS AND METHODS OF STATELESS PROCESSING IN A FAULT-TOLERANT MICROSERVICE ENVIRONMENT

TECHNICAL FIELD

Embodiments described herein generally relate to network security. In particular, embodiments described generally relate to systems and methods of stateless processing in a fault-tolerant microservice environment.

BACKGROUND INFORMATION

The expansion of cloud computing services has led to collections of servers to provide computing capacity to run various client applications. Some client-server connections use private networks. Other client-server connections use virtual private networks to exchange data over a public network as if they were directly connected by private networks. With the expansion of cloud computing services has come an expansion of datacenters to host servers. Some hosted servers are housed in multi-tenant datacenters, and share resources with other, potentially unrelated servers.

Data security and monitoring network traffic is useful in such datacenters. Data traveling between servers and client applications needs to be monitored and processed for security. Monitoring security in high-bandwidth datacenters often uses many security servers working in tandem. One problem to be addressed is how to recover from failure of one server among many.

BRIEF DESCRIPTION OF THE DRAWINGS

The various advantages of the embodiments disclosed herein will become apparent to one skilled in the art by reading the following specification and appended claims, and by referencing the drawings, in which:

DETAILED DESCRIPTION

Figure 1:
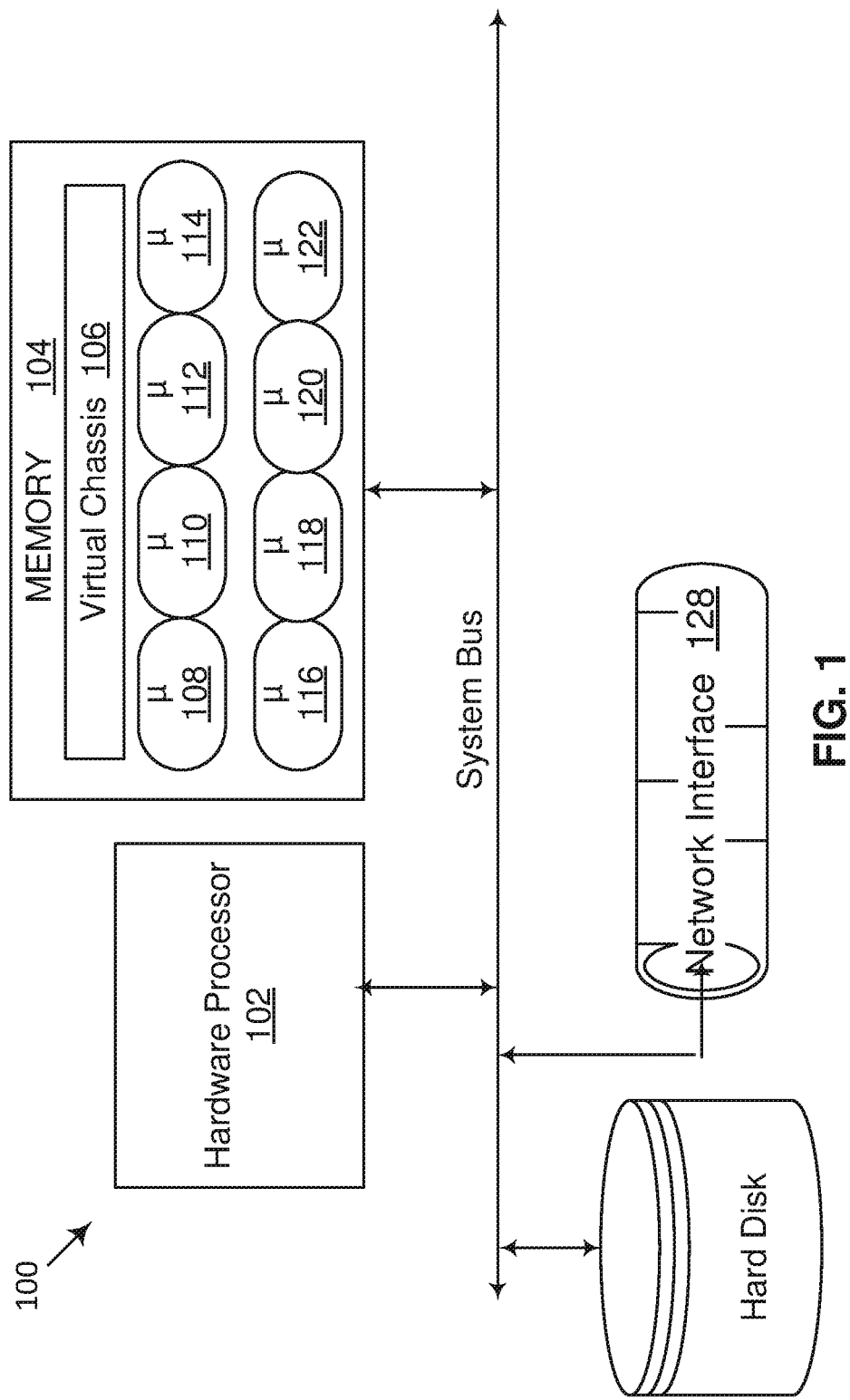
FIG. 1 is a block diagram illustrating computer hardware for loading network security system microservices from a memory and executing them by a processor.

In the following description, numerous specific details are set forth. However, it is understood that embodiments of the disclosure may be practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

When deploying distributed network processing systems in which individual components are load balanced, the issue of managing state often limits the scale or performance of the architecture. If state is maintained locally, within each component, processing will generally require future processing of the same flow or connection to be routed to the same component regardless of load or queueing conditions. Additionally, the failure of a server, node or virtual machine on which the stateful component executes may cause state to be lost and require applications to time out and reconnect to servers.

Distributing state among pairs of components (such as active-active network appliances) requires synchronization of each state update and is a performance limitation. Such a solution allows for an application to maintain a connection during failover (as state is always replicated to the active partner) but does not allow processing capability to scale beyond the capabilities of the state synchronization infrastructure. As an example, if two active-active servers are connected by a fast interface allowing fast transfer of state data, the applications utilizing this link cannot scale beyond the constraints of the servers themselves.

Embodiments disclosed herein allow a hierarchy of microservices to perform stateful processing of network traffic within a security service. State is maintained outside the microservices within a redundant state service accessed through a redundant messaging service. The redundant state service provides state for a context associated with the processing of the network traffic as well as state for the processing of security services, such as deep packet inspection (DPI) state, encryption state, etc.

As will be detailed, the context serves as a directive, instructing multiple levels of the microservice hierarchy as to the levels of service and processing to be performed. The context is transmitted with packet and content data among microservices allowing subsequent microservices in the hierarchy to forego state lookup and modification and allowing failover operation to occur transparently as part of load balancing.

FIG. 1 is a block diagram illustrating an embodiment of components of a scalable microservice architecture using microservices. Network security system microservices are stored in memory (e.g., volatile memory such as Random Access Memory (RAM) and/or non-volatile memory such as disk) and executed by one or more hardware processors or processor cores. Network security system microservices, consisting of computer-executable instructions to perform a specific security service, are deployed based on configuration across available physical servers. Typically, each microservice receives configuration and tasks via a backplane of a virtual chassis 106 and returns status, statistics and other information to the backplane. A common property of a microservice is the separation and protection of memory from other microservices. In this manner, an individual microservice may be moved to another physical server or terminate abnormally without impacting other microservices.

The data processed by the security system is transferred from a microservice to another (higher hierarchy) microservice using a data plane. In some embodiments, during such a transfer, the lower microservice makes a decision (based on configuration, current statistics and other information) as to which higher-hierarchy microservice to utilize. Such a decision may constitute a load-balancing decision to assure that the higher-hierarchy microservices are efficiently utilized. In other embodiments, the decision of which microservice to utilize is made by a more central entity.

As illustrated, network security system utilizes a hardware processor 102 (such as a central processing unit (CPU) or one or more cores thereof, a graphics processing unit (GPU) or one or more cores thereof, or an accelerated processing unit (APU) or one or more cores thereof) to execute microservices store in memory 104 (e.g., volatile memory such as Random Access Memory (RAM) and/or non-volatile memory such as disk). A network interface 128 (e.g., fabric or interconnect that is wired or wireless) provides a means for communicating with a data center. Network security system may inspect traffic, detect threats, and otherwise protects a data center, as further described below, using microservices.

Embodiments of a network security system providing the above capabilities are now discussed in more detail. Network security system adds security to, or enhances the security of, a datacenter. In an embodiment, network security system is delivered in the form of a seed software application (e.g., downloaded). The seed software application instantiates microservices of the network security system on a host in the datacenter. As used herein a microservice container refers to where the microservice runs, most prominently a virtual machine. Once deployed, network security system utilizes a hardware processor 102 (as detailed above), memory 104, and network interface 128. In many scenarios, security may be added/configured using existing hardware and/or without having to purchase specific rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

Once initiated, as also further described below, network security system, in some embodiments, will utilize network interface 128 to explore the datacenter to discover what network segments exist, the security to apply to various network segments, what hosts and hardware resources are available, and additional configuration information as needed. In an embodiment, the datacenter itself includes several machines with hypervisors, or physical hardware, and the network security system 100 offers microservices to communicate with and protect one or more of those internal virtual machines or physical hardware. After performing datacenter discovery, network security system will, in some embodiments, then offer or suggest available security tools to be selected either through a user interface, or by connections with existing enterprise management software. In one embodiment, once configured, network security system is deployed "in-line," receiving substantially all of the packets headed for the datacenter, allowing network security system to intercept and block suspicious traffic before it the datacenter. With an understanding of the datacenter, network security system 100 deploys microservices to inspect traffic throughout the datacenter, not just at the ingress. In some embodiments, network security system is deployed in a "copy only" configuration, in which it monitors traffic, detects threats, and generates alerts, but does not intercept traffic before it arrives at the datacenter.

Referring again to FIG. 1, though not shown, hardware processor 102 in one embodiment includes one or more levels of cache memory. As shown, memory 104 has stored therein microservices 108, 110, 112, 114, 116, 118, 120, and 122, (108-122), as well as virtual chassis 106, which is itself a microservice. In an embodiment, the microservices are small in size, consisting of a relatively small number of instructions. In an embodiment, the microservices are independent of each other. As illustrated, microservices 108-122 are microservices that are loaded from memory and executed by the hardware processor 102. Those microservices include datapath security microservices, for example TCP/IP, SSL, DPI, or DPL inspection microservices, as described further below with respect to FIGS. 2 and 3. The microservices may also include management microservices, for example a chassis controller to manage the microservices, a configuration microservice, an infrastructure discovery microservice, a database microservice to store data, and a policy update microservice to receive policy updates from an external security cloud, and a compiler to receive policy data from various sources and to produce binary policy outputs to be used by the microservices, to name a few examples that are described further below with respect to FIGS. 2 and 3.

Network security system receives traffic via network interface 128 to/from s datacenter. In one embodiment, network security system is placed in-line to inspect traffic, and potentially intercept a threat before it arrives at, or leaves, the datacenter. In alternate embodiments, network security system monitors the traffic heading into, or out of, the datacenter, in which case the network security system detects threats and generates alerts, but does not block the data. Hardware processor 102 then executes various data security microservices on the data. For example, as will be described further below with respect to FIGS. 2 and 3, typically traffic first passes into and through a segment microservice, then a TCP/IP inspection microservice, then an SSL microservice, then a DPI microservice, then a NOX microservice, and then a DLP microservice. However, one or more of these services may not be enabled. In some embodiments, a segment microservice resides within a network segment and serves as the entry point for data packets and forwards the packets to appropriate microservices for further analysis. Datapath microservices as used herein refer to various microservices that inspect and analyze network traffic, such as TCP, TLS, DPI, NOX, or DLP. TCP microservice, for example, refers to a packet handling microservice able to process any layer 4-6 network packet and includes part of Firewalling. TLS microservice, for example, refers to Transport Layer Security microservice, which decrypts/re-encrypts connections. DPI microservice, for example, refers to Deep Packet Inspection microservice and handles layer 7 inspection. NOX microservice, for example, refers to Network Object Extractor microservice, and works in conjunction with DPI to assemble objects from individual packets and deliver them to other services. DLP microservice, for example, refers to Data Loss Prevention microservice, which detects and prevents data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices will, in one embodiment, be reported to a chassis controller microservice, which takes remedial action.

processor 102 is a multi-core processor. In alternate embodiments, hardware processor 102 is a massively parallel processor.

In some embodiments, virtual chassis 106 and microservices 108-122 may be hosted on any of a wide variety of hardware platforms used in the datacenter to be protected. Table 1, below, lists and describes a number of exemplary datacenter environments, any one of which hosts virtual chassis 106 and microservices 108-122:

TABLE 1

Environments for hosting virtual chassis 106

| Environment | Description |
| --- | --- |
| Bare Metal | This environment is associated with the North/South Use Case. Network security system microservices will be hosted on ESX hypervisors and physical hosts upon which the FE microservices reside will be connected to the physical network where required. There will be no orchestration/integration touch point for this environment. |
| ESX | This environment is associated with the East/West Use Case. Network security system microservices will be hosted on ESX hypervisors. The orchestration/integration touch point will be vCenter. |
| NSX | This environment is associated with the East/West Use Case. Network security system microservices will be hosted on ESX hypervisors. The orchestration/integration touch point will be NSX Controller. |
| OpenStack | This environment is associated with the East/West Use Case. Network security system microservices will be hosted on KVM hypervisors. The orchestration/integration touch point remains to be determined. Because of the fragmented nature of the OpenStack market, the Network security system) will be developed and tested to a single choice of version, distribution and network controller and will then be customized on a customer-by-customer basis. |
| AWS | This environment is associated with the Public Cloud Use Case. Network security system microservices will be hosted as AWS instances. The orchestration/integration touch point will be AWS Config/AWS OpsWorks. |
| Microsoft Azure | This environment is associated with the Public Cloud Use Case. Network security system) microservices will be hosted as Azure Virtual Machines. The orchestration/integration touch point will be Azure Automation and Runbooks. |

In an embodiment, microservices 108-122 are implemented using computer-executable instructions loaded from the Internet, via network interface 128. For instance, in an embodiment, the microservices are implemented with computer-executable instructions downloaded from a web site or online store site. In some embodiments, microservices 108-122 are loaded into memory 104. In various embodiments, the microservices are implemented using computer-executable instructions loaded on and received from a non-transitory computer readable medium, such as digital media, including another disc drive, a CD, a CDROM, a DVD, a USB flash drives, a Flash memory, a Secure Digital (SD) memory card, a memory card, without limitation. Microservices received from a digital medium in one instance are stored into memory 104. The embodiments are not limited in this context. In further embodiments, a digital medium is a data source that constitutes a combination of hardware elements such as a processor and memory.

In most embodiments, network security system runs on a datacenter computer. In alternate embodiments, however, network security system is installed and runs on any one of a wide variety of alternate computing platforms, ranging from low-cost to high-cost, and from low-power to high power. In some embodiments, network security system is installed on and runs on a low-cost, commodity server computer, or, in some embodiments, on a low-cost rack-mounted server. As illustrated, hardware processor 102 is a single core processor. In alternate embodiments, hardware In some examples, network security system scales out using available resources to accommodate higher traffic or load. In an exemplary embodiment, hardware processor 102 (CPU) and memory 104 are scaled out or in dynamically as needed: additional CPUs and memory are added if scaling out, and some CPUs and/or memory are powered down if scaling in. This scaling out is performed to allocate the additional CPUs and memory to those portions of the security hierarchy for which they are needed while not allocating additional CPUs and memory to those portions of the security hierarchy that can accommodate the higher traffic utilizing their existing allocation.

A common property of a microservice is the separation and protection of memory from other microservices. In this manner, an individual microservice may be moved to another physical server or terminate abnormally without impacting other microservices. Microservices may be distinguished from threads in that threads generally operate within a shared memory space and exist within the confines of the operating system on which they were spawned.

Figure 2:
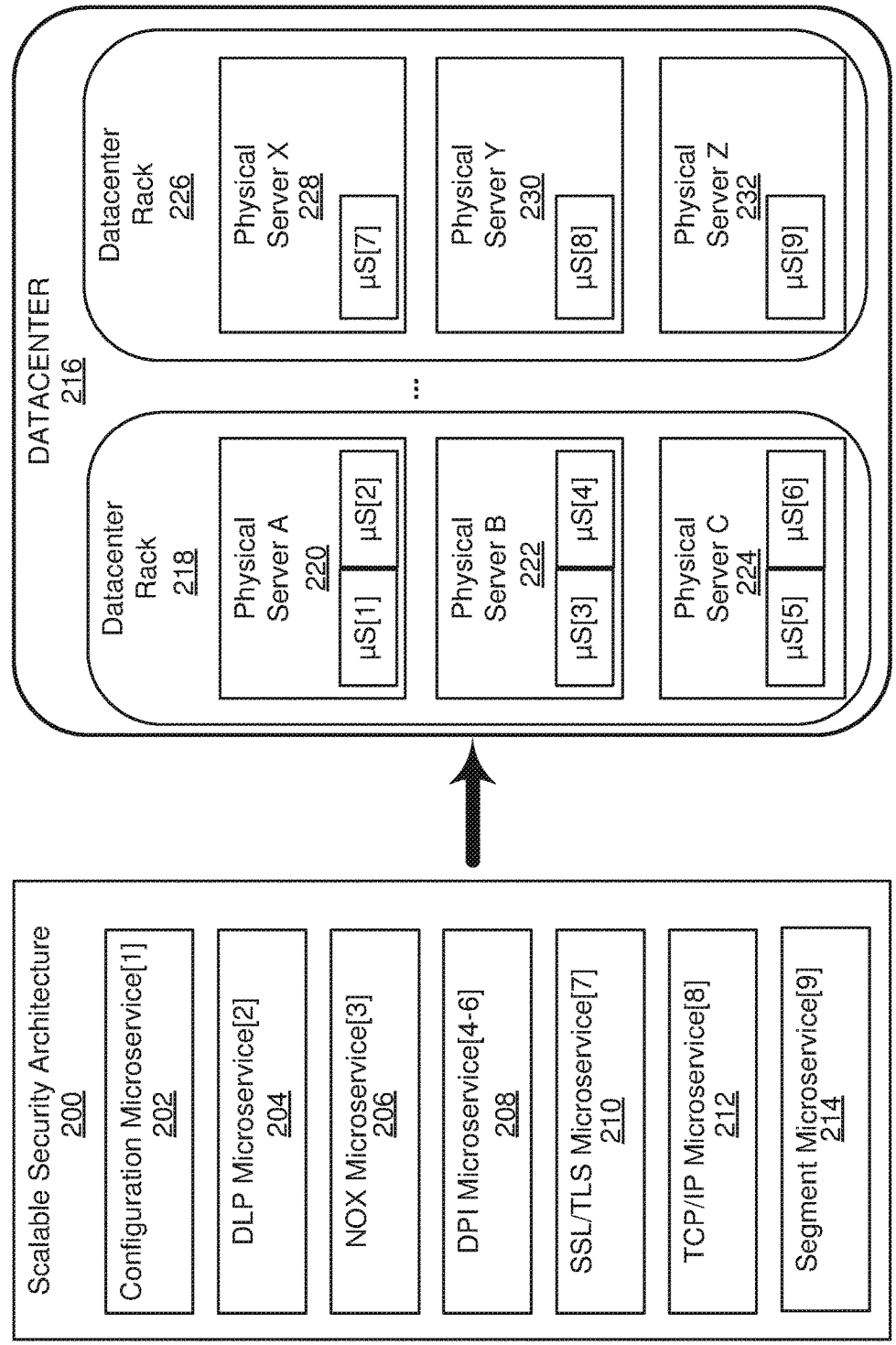
FIG. 2 illustrates an embodiment of a scalable security architecture implementing a three-time scale out using security microservices.

FIG. 2 illustrates a three-time scale out, according to an embodiment, using microservices. In this example, only a single microservice (DPI) would benefit from additional resources. As shown, by utilizing a scalable microservice architecture 200, including DLP microservice 204, NOX microservice 206, DPI microservice 208, SSL/TLS microservice 210, TCP/IP microservice 212, and segment microservice 214, each layer of the security service hierarchy is scaled and configured independently to load balance the supply of processed data to the next hierarchy level. As shown, datacenter 216 includes datacenter rack 218, which includes physical server A, 220, physical server B, 222, and physical server C, 224. As shown, datacenter rack 226 includes physical server X, 228, physical server Y, 230, and physical server Z, 232. DPI microservices 208 have been scaled out 3×, and in this instance assigned to be performed as microservices 4-to-6 on physical server B 222 and physical server C 224. The remaining microservices of scalable security architecture are shown as being implemented by physical servers A, X, Y, and Z, 220, 228, 230, and 232. A configuration microservice 202 creates a configuration backplane and a data plane deployed as a software component on each physical server that is to receive security services. This creating process takes the form of configuring routing rules, reserving network address space (such as a subnet) and configuring virtual environments to utilize portions of the reserved address space as gateways for network communication in and out of the servers to be secured. Both the backplane and data plane may thus be considered virtual networks managed by the security system. All security microservices may then utilize these networks to transmit packets, content, state and other information among themselves. The properties of the backplane and data plane are configured to reject packet traffic from outside the security system and route information between microservices regardless of the physical server and virtual environment configuration.

Figure 3:
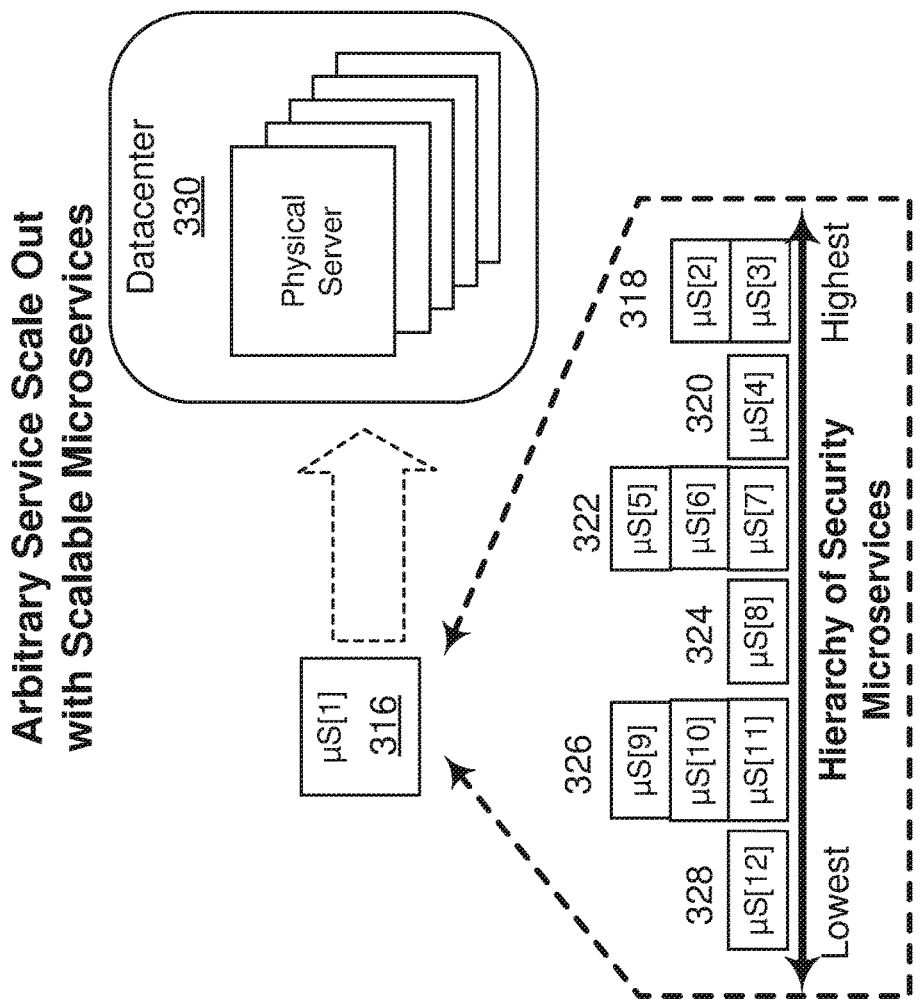
FIG. 3 illustrates an arbitrary scaling out of a microservice according to an embodiment.
Figure 3:
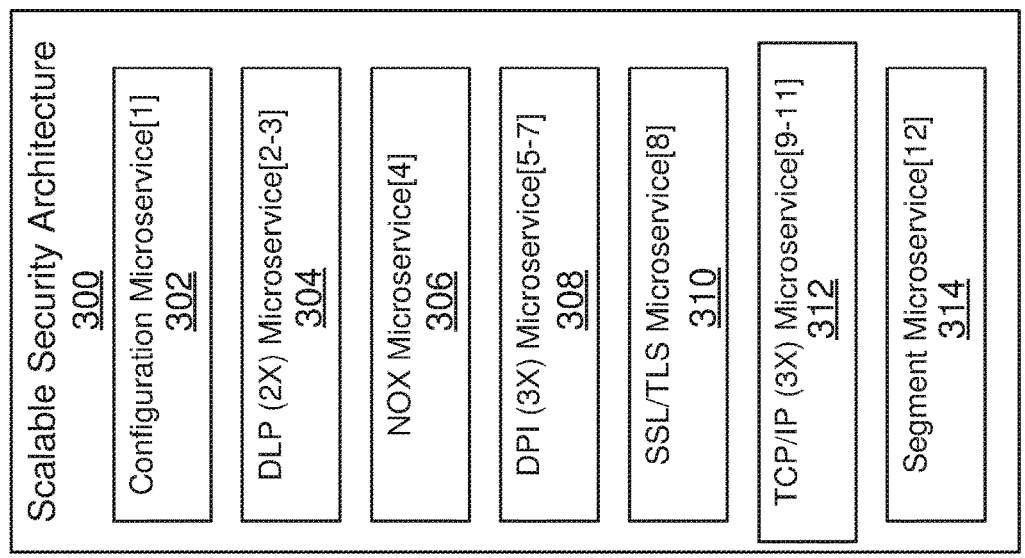

FIG. 3 illustrates an arbitrary scale-out according to an embodiment. As shown, scalable security architecture 300 includes configuration microservice 302, DLP (2×) microservice 304 (a 2-times scale-out), NOX microservice 306, DPI (3×) microservice 308 (a 3-times scale-out), SSL/TLS microservice 310, TCP/IP (3×) microservice 312 (a 3-times scale-out), and segment microservice 314. As shown, configuration microservice 316, provisions (318, 320, 322, 324, 326, and 328) the 11 microservices from a lowest hierarchy to a highest hierarchy, and configures them to communicate with each other via a backplane. The microservices are implemented by physical servers in datacenter 330.

Figure 4:
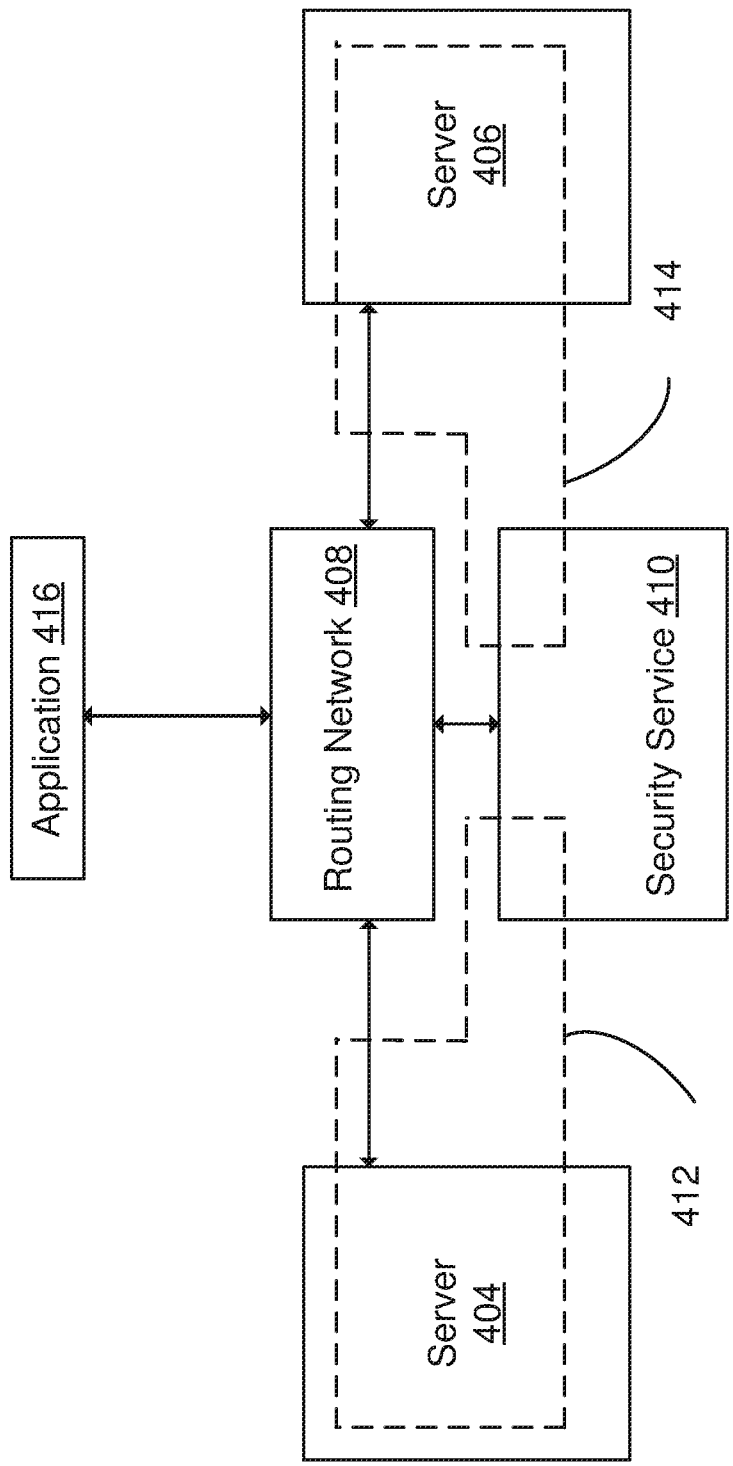
FIG. 4 is a block diagram illustrating a security service to monitor traffic between an Application and one or more servers through a routing network according to an embodiment.

FIG. 4 is a system level block diagram according to an embodiment. One or more security services 410 monitor traffic between an application 416 and one or more servers 404 and 406 through a routing network 408 according to an embodiment. The security service 410 is a group of microservices that used to secure traffic from/to the application 416 and the servers 404 and 406. These microservices do not need to be confined to one physical server such as server 404 or server 406. For example, one or more microservices of the security service 410 may be executed on server 404 and other microservices of the security service 410 are executed on server 406. In some embodiments, the security service 410 is executed on a server that it is not protecting.

Routing network 408 provides connectivity among server 404, server 406, security service 410, and application 416, and may support encapsulation protocols employed by embodiments disclosed herein. In some embodiments, routing network 408 is partially configured responsive to hypervisor configuration of servers 404 and 406.

By virtue of routing information included in channel data encapsulation packets, as explained further below, data traveling between an application 416 and server 404 and/or server 406 is routed to the correct server, and is kept separate from data traveling between the application 416 and the other server. Accordingly, what is essentially a private network 412 is created between the server running security service 410 and server 404. Similarly, what is essentially a private network 414 is created between the server running security service 410 and server 406.

Figure 5:
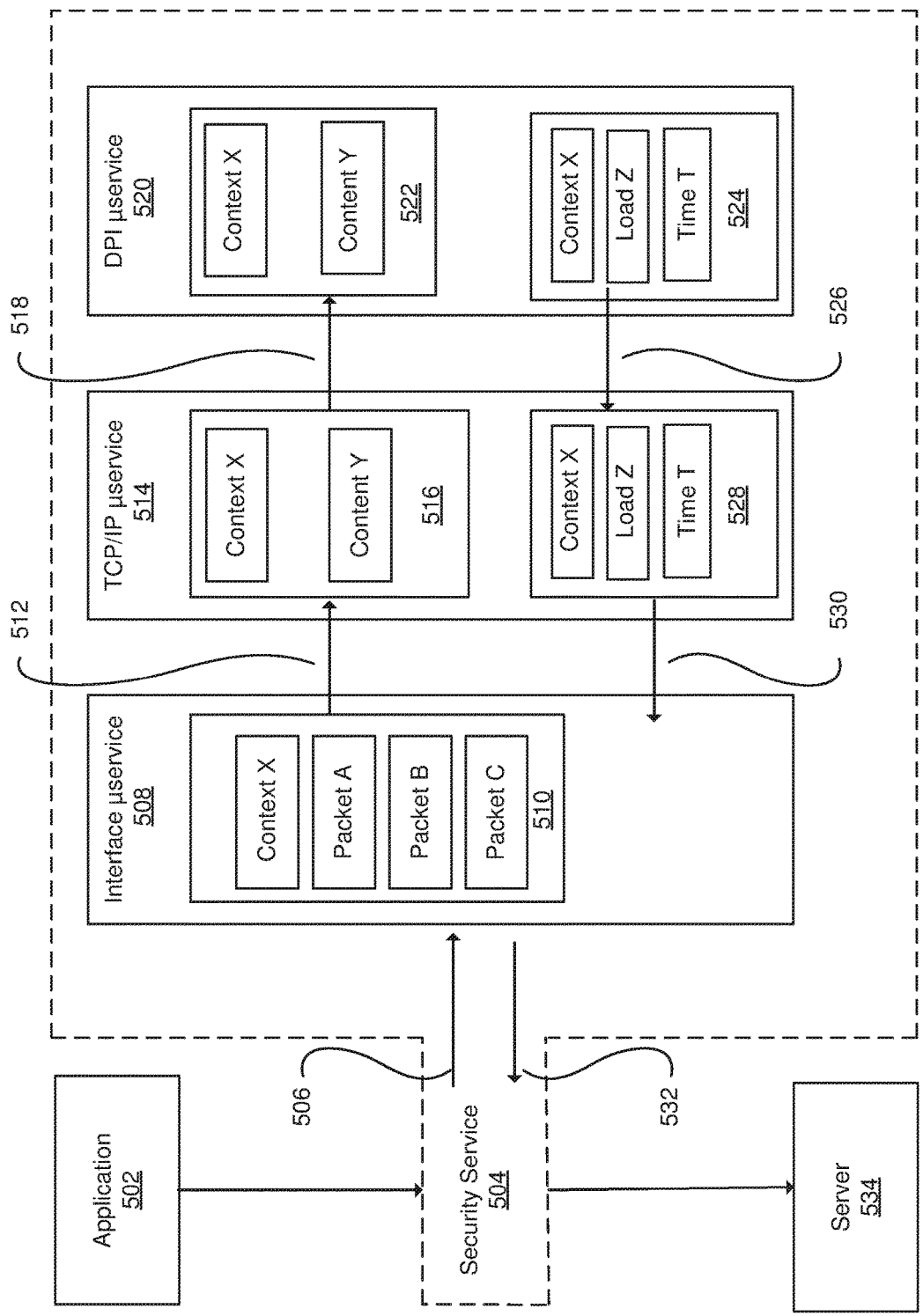
FIG. 5 is a block flow diagram illustrating application data traversing to a server after passing through a hierarchy of a security microservices according to an embodiment.

FIG. 5 is a block flow diagram illustrating application data traversing to a server after passing through a hierarchy of a security microservices according to an embodiment. As illustrated, the flow begins with security service 504 receiving a network data packet from application 502. Security service 504 forwards 506 the packet to interface microservice 508, which generates a channel data encapsulation packet 510, which encapsulates three packets A, B, and C, and context X. As shown, channel data encapsulation packet 510 encapsulates three packets, but in alternate embodiments, the number of encapsulated packets may vary, without limitation. In some embodiments, context X is generated based at least on the headers of packets A, B and C. In some embodiments, context X is generated through a lookup of packet header fields such as IP addresses, ports and mac addresses for the source and/or destination of the packets. In some embodiments, the generation of context X includes utilizing an interface identifier obtained from a virtualization environment. Generation of context X may be accomplished through a lookup of header fields and other data in a table, a hash of header fields and other data or another method whereby packets for which a common security policy is to be applied will have a common context or common portion, such as a bit field, of the context.

Context X may be considered an identifier describing the traffic streams, source machines or applications responsible for generating packets A, B and C. This identifier may be direct (such as an ID used as a table look up), indirect (such as a pointer used to access a data structure) or some other method of instructing microservices as to the policies and processing to use for handling packets A, B and C. As an example, context X may be generated by performing a hash, longest prefix match or lookup of header fields such as IP addresses, TCP Ports, Interface Names (or MAC Addresses) or other packet properties. The lookup may be an exact match, longest prefix match or other method to associate packet streams with the same security processing to use. The generated context may then be used by security services, such as a DPI service, to determine which rules should be utilized when scanning the data from packets A, B and C (and other packets that are part of the same traffic stream). This information may be embedded within the context (as a bit field or other information), available by indirection (such as a table or data structure lookup by another service) or generated programmatically based on any combination of such information.

The context may be generated through a look up at an interface microservice and is included in the transmission of packet data to transmission control protocol (TCP) reassembly services. Reassembled content from the TCP microservice is transmitted to a deep packet inspection (DPI) microservice or secure socket layer (SSL) microservice, and with the same context. By maintaining this context in the encapsulation of data transport throughout the microservice hierarchy, processing directives associated with a context become a shared read-only resource (relative to the microservices) that will only rarely use stateful updates.

Interface microservice 508 transmits 512 the channel data encapsulation packet 510 to TCP/IP microservice 514. As shown the channel data encapsulation packet 516 includes context X and content Y, which corresponds to packets A, B, and C of channel data encapsulation packet 510. After conducting security processing of the channel data encapsulation packet 516, TCP/IP microservice 514 transmits 518 it to DPI microservice 520. As shown the channel data encapsulation packet 522 includes context X and content Y, which corresponds to packets A, B, and C of channel data encapsulation packet 510. After conducting security processing of the channel data encapsulation packet 522, DPI microservice 520 generates channel data encapsulation packet 24, which, as shown, includes context X, DPI load Z, and DPI timestamp T. Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data.

As shown, DPI microservice 520 transmits, via path 526, channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCPI/IP load Z, and TCP/IP Timestamp T. As shown, TCP/IP microservice 514 transmits, via path 530, channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534.

As shown, DPI microservice 520 transmits channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCP/IP load Z, and TCP/IP Timestamp T. As shown, TCP/IP microservice 514 transmits channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534. μservice The benefits of the security service 504 include the ability of each microservice to utilize the same channel data encapsulation protocol for all communication, thereby allowing scaling across the entirety of the datacenter network routable via the channel data encapsulation header. Communications between microservices maintain Context X generated at Interface microservice 508 to all subsequent microservices that no longer have access to the original packets. By providing load and timestamp data in the channel data encapsulation packets 524 and 528, which are returned via paths 526 and 530, the microservices receive and can maintain real-time loading and processing latency information utilized to make load balancing decisions.

Figure 6:
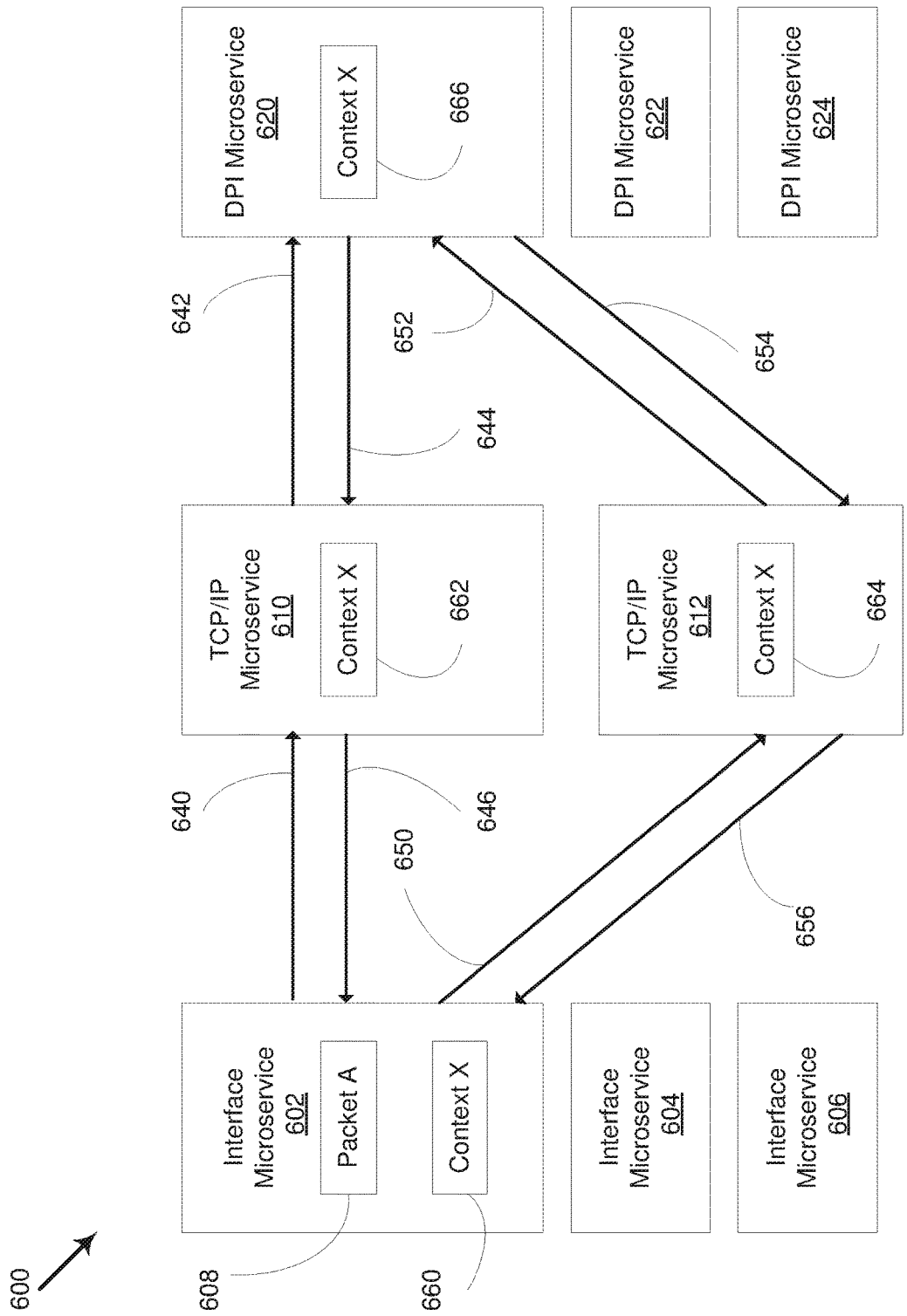
FIG. 6 is a block flow diagram illustrating an embodiment of a flow of application data through a stateless processing fault-tolerant microservice environment.

FIG. 6 illustrates an embodiment of a flow of application data through a stateless processing fault-tolerant microservice environment. As illustrated, security system 600 includes one or more interface microservices 602, 604, and 606, one or more TCP/IP microservices 610 and 612, and one or more DPI microservices 620, 622, and 624. Some embodiments include a different number and/or type of microservices. In the illustrated embodiment, interface microservice 602 receives packet A 608 and generates context X 660 based on content of the packet and information about the packet.

When packets belonging to a certain context (e.g., context X), both TCP/IP microservices 610 and 612 perform work on them. Generally, this follows a threaded model with shared memory for state, a process model with a unified, central state repository or an orthogonal balancing mechanism assuring that the same contexts are always processed by the same microservice.

Some security systems implement TCP/IP security processing as threads of the same process, allowing each thread to access each thread's memory. However, if one thread performs abnormally, it may contaminate the memory of all the threads associated with that process. Implementing TCP/IP microservices 610 and 612 as microservices avoids this because each microservice has a distinct memory that is not shared.

Security systems may also implement TCP/IP as processes with separate state and hash (or divide) incoming packets so as to assure that related packets will always be processed by the same TCP/IP process. This allows state to be kept orthogonal such that the two or more TCP/IP processes will not need to share state. Such an approach may suffer from problems, including poor load balancing efficiency. Additionally, the TCP/IP processes' state may need to be shadowed so that another TCP/IP process may take over if one of the TCP/IP processes should fail.

In embodiments detailed herein, TCP/IP microservices 610 and 612 (or other microservices) have an external state structure and a context that accompanies all processed data. Each TCP/IP microservice, and each other microservice at every level of the security hierarchy, is isolated from other microservices and can be scaled independently. Each microservice can access the state for packets or reassembled packet data allowing real-time load balancing using a global state service (described with respect to FIG. 7). In many cases, the context allows a microservice to forgo consulting service state (state associated with processing at the hierarchy level of the specific microservice), thereby reducing the demands on the global state service.

As an example, consider the context 662 obtained by TCP/IP microservice 610 as part of packets received from Interface microservice 602, via path 640. This context was generated by Interface microservice 602 using the process previously described and is forwarded as part of any security service request initiated by TCP/IP microservice 610. Context 662, when transmitted to DPI microservice 620 as part of path 642 along with the reassembled packet data, contains information that may allow DPI microservice to forego or simplify processing of this reassembled data. Such information can include a context bit or field specifying that only a subset of regular expressions or patterns need to be used for DPI processing. A DPI state lookup may be avoided if the context specifies that a specific number of bytes of reassembled data should be received before beginning DPI processing, specific protocols are allowed or disallowed and other information. A context state lookup may be avoided if the context specifies that no DPI processing result may quarantine the flow, e.g., the flow is within a trusted perimeter.

Embodiments disclosed herein include microservices that are stateless. Each of the microservices retrieves state from an outside source such that it may process packets or content belonging to any context. Each microservice may retrieve and update service state (state associated with the microservice processing). Additionally, each microservice may retrieve and update context state (state associated with the context relevant for all security service processing). In some embodiments, the process state and context state share a global state service (See FIG. 7). Examples of elements of context state include a level of suspicion regarding traffic from a source IP, a policy to ignore certain ports or protocols and other information used to process the packets, reassembled content and extracted objects from communication identified with the context, etc.

Multiple TCP/IP microservices or microservices at different hierarchies of the security system are able to process packets having the same context at the same time. If one security microservice should fail, for example if a TCP/IP microservice fails to respond to a request, this allows another microservice to take over using the failed microservice's context.

Returning to FIG. 6, the generation of context X 660 may consider not only properties associated with packet A 608, such as the n-tuple detailing its routing information, but also a state lookup or a context lookup, as well as other information. Interface microservice 602 provides packet A 608 and context X 660 to TCP/IP microservice 610 or 612 via path 640 or 650, respectively. Interface microservice 602 may conduct a load-balancing to select one of the TCIP/IP microservices to which to forward the packet A 608 and the context X 660.

TCP/IP microservices 610 and 612 are stateless, but benefit from the context X generation performed by interface microservice 602. Whichever of TCP/IP microservice 610 or 612 receives packet A disassembles the packet to extract the data associated with the packet and to perform security processing on the data. TCP/IP reassembly generally consists of associating packets with flows (identified by source and destination IP and Port values) and using the TCP sequence numbering to place the packets into correct order, remove any overlap or duplication and identify missing or out of order packets.

TCP/IP microservice 610 or 612 forwards the context and the extracted data and/or the data resulting from the security processing to DPI microservice 620 via path 642 or 652, respectively. DPI microservice 620 disassembles the received data to extract the data associated with the packet and to perform security processing Along with the transmitted data, TCP/IP microservices 610 or 612 forwards context X 662 or 664, respectively, to DPI microservice 620. In some embodiments, context X 660, 662, 664, and 666 are substantially identical.

TCP/IP microservice 610 is stateless and benefits from the context provided by interface service 602. The context may specify the parameters of TCP/IP processing such as the amount of data to reassemble for specific protocols before forwarding to DPI processing and tolerance of and special handling for out of order packets. DPI microservice 620 is also stateless and benefits from the context provided by TCP/IP microservice 610 or 612 via paths 642 or 652. DPI microservice 620 may have a DPI processing state to be loaded before processing the received data, but can perform some work (such as scheduling different DPI pattern state tables) based on the context alone. Transmitting the context to the DPI microservice 620 therefore provides a benefit of obviating some amount of work by the DPI microservice.

If TCP/IP Microservice 610 fails and interface microservice 602 utilizes TCP/IP Microservice 612, DPI microservice 620 will still obtain the context from the transmission of reassembled TCP content in path 652.

Although FIG. 6 does not show a second packet, when a subsequent packet associated with the same context is received, interface microservice 602 will conduct a load balancing and select one of the TCP/IP microservices to which to forward the packet along with context X 660. For example, interface microservice 602 chooses to forward the second packet to TCP/IP microservice 612 via path 650. TCP/IP microservice 612 performs some security processing, then transmits the second packet and context X 664 to DPI microservice 620 via path 652. After performing some security processing, DPI microservice 620 responds to TCP/IP microservice 612 via path 654, and TCP/IP microservice responds to interface microservice 602 via path 656. Both TCP/IP microservice 610 and DPI microservice 620 provided responses to their received requests for security processing as 644 and 646 respectively. In one embodiment, each response includes the context that was part of the request for security processing.

In some embodiments, an interface microservice transmits packets to a TCP/IP microservice along with a context that has been generated based on the contents of the packets. The transmission comprises a request to perform a security service (TCP/IP reassembly) for the packets to generate reassembled data. The TCP/IP microservice consults the received context to determine whether a context state, service state or both are to be obtained from a state repository to perform its security service. Reassembly is performed by the TCP/IP microservice, any modified state returned to the state repository, and the reassembled data transmitted, along with the context, to a DPI microservice as a request to perform DPI processing.

The DPI microservice receives the reassembled data and context from the request to perform DPI security services transmitted by the TCP/IP microservice. The DPI microservice consults the received context to determine whether a context state, service state or both must be obtained from a state repository to perform its security service. DPI inspection is performed by the DPI microservice, any modified state returned to the state repository and a response sent to the TCP/IP microservice.

Generically, each microservice receives a request to perform a service, performs the requested service using context state, service state, or both, stores any modified state, and transmits the processed data along with a context to a subsequent microservice (if there is one).

Figure 7:
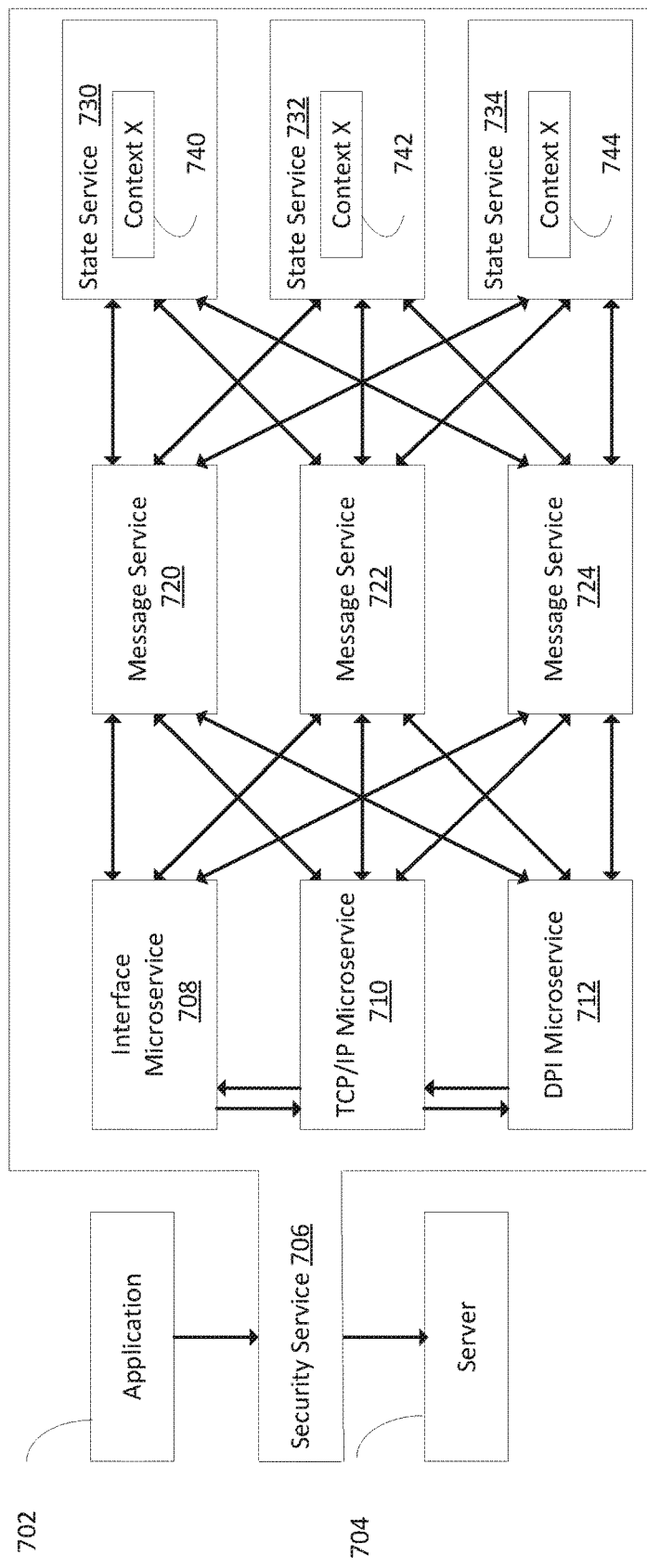
FIG. 7 is another block flow diagram illustrating an embodiment of a channel state lookup system.

FIG. 7 illustrates an embodiment of a using service state lookup. For illustrative purposes, security service 706 includes one each of interface microservice 708, TCP/IP microservice 710, and DPI microservice 712. Security service 706 is deployed to provide security services for communications between application 702 and Server 704 and may be deployed to provide those services for the communications among a plurality of applications and servers. In other embodiments, security service 706 contains a different number of instances of those microservices. Each of interface microservice 708, TCP/IP microservice 710, and DPI microservice 712 has a connection to a state service group consisting of state services 730, 732, and 734 through message services group consisting of message services 720, 722, and 724. Each of state services 730, 732, and 734 includes a state content store, 740, 742, and 744, respectively. In some embodiments, state services 730, 732, and 734 communicate with each other. In some embodiments, although a state for a particular flow (application to server communication path) is maintained in one of state content stores 740, 742, and 744, any of state services 730, 732, and 734 is able to accept requests for state, and forward the request to the state service having that state in its state content store. In some embodiments, any of state services 730, 732, and 734 is able to accept a request to update state for a flow, in which case the selected state service updates the other state services to synchronize all copies of state services 730, 732, and 734. The acknowledgement of the update request may be sent before or after the synchronization is confirmed based on configuration. In some embodiments, each of interface microservice 708, TCP/IP microservice 710, and DPI microservice 712 selects a one of state services 730, 732, and 734 to receive a state-related request. In other embodiments, each of interface microservice 708, TCP/IP microservice 710, and DPI microservice 712 sends state-related requests to one of message services 720, 722, and 724, and the message service selects one of state services 730, 732, and 734 to which to forward the request. The above allows a microservice to communicate with any state service directly or through any message service, and to get, put, update, or initialize a state record.

Figure 8:
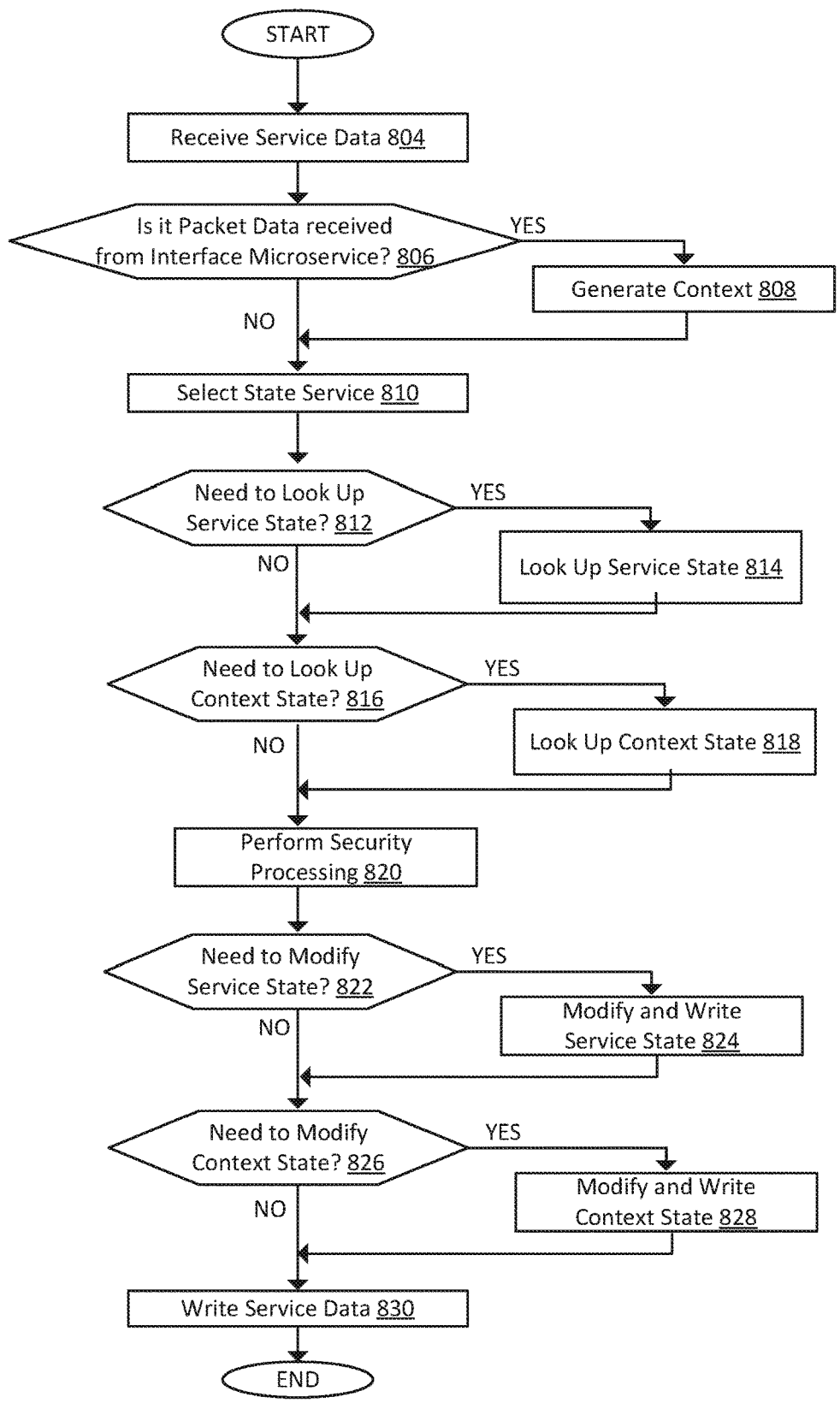
FIG. 8 is a flow chart demonstrating a microservice processing flow according to an embodiment.

FIG. 8 illustrates an embodiment of a method performed by a microservice. The microservice receives service data 804 from a system interface (network card, virtual network interface or other interface) or from another microservice.

At 806 the microservice determines whether the received data was packet data received from an interface microservice, in which case the interface microservice will generate a context at 808 and return to the flow. The type of data being transported may be implicit (an interface microservice sends packets, a TCP/IP microservice sends reassembled packet data, etc.) or specified as part of the communication between microservices. In some embodiments, the microservice utilizes an encapsulation protocol specifying the content within each encapsulated transmission.

Microservices above the interface microservice in the hierarchy will receive a context as part of this transmission. At 810, a state service is selected and context state and service state are obtained corresponding to the processing to be performed on the service data received at 804. In some embodiments, the selection is driven or influenced by the context, such as requesting a priority or higher performance state service based on the context.

At 812, the microservice determines whether the service state needs to be looked up, and, if so, at 814 looks up the service state and returns to the flow. In one embodiment, the microservice determines whether service state is to be used using information from the context, the source data or a combination of both. Examples of this determination include the determining within a DPI or SSL microservice that DPI or SSL processing should not occur unless reassembled data is at least a specific size based on a portion or bit-field of the context and the determining within a TCP/IP microservice that out of order packets should be dropped based on a portion or bit-field of the context. In these exemplary (and other) cases, the service state is not typically retrieved.

At 816, the microservice determines whether the context state needs to be looked up, and, if so, at 818 looks up the context state and returns to the flow. In one embodiment, the microservice determines whether context state is to be used using information from the context, the source data or a combination of both. Examples of this determination include the determining by a TCP/IP service that the reassembled content comprises SSL data based on the context the determining within a DPI or SSL microservice that DPI or SSL processing should not occur unless reassembled data is at least a specific size based on a portion or bit-field of the context. In these exemplary (and other) cases, the context state need not be retrieved.

The determinations 812 and 816 may be made in any order, based on the preference of the designer, performance optimization or other reason.

At 820, security processing is performed. At 822, the microservice determines whether the service state needs to be modified, and, if so, at 824 modifies the service state and returns to the flow. In one embodiment, the microservice determines whether service state must be modified (returned in altered form to the state service) based at least in part on whether the service state changed as a result of the processing performed by the microservice. An example of such a determination includes the determining by a DPI service that the state of a regular expression parser used to parse the service data has changed and the determining by a TCP/IP service that an out of order packet has been received.

At 826, the microservice determines whether the context state is to be modified, and, if so, at 828 the microservice modifies the context state. In one embodiment, the microservice determines whether context state is modified (returned in altered form to the state service) based at least in part on whether the context state changed as a result of the processing performed by the microservice. An example of such a determination includes the determining by a DPI service that the result of pattern scanning indicates a security risk. Updating the context state as a result of such determination may cause other microservice to alter their operation (respond to a change in context state) and further reduce their expending effort to retrieve service state. As an example, a communication path to be quarantined by a DPI microservice (due to some detected anomaly) may indicate, as part of context state, that all other communication from the same source IP (potentially infected system) be quarantined as well.

At 830, results of the security processing, including the context, are written as output to the next hierarchy security service (as a further security service request), a response to the received request (such as an indication of what patterns were matched as part of DPI processing) or both. Higher microservices in the hierarchy of microservices may include the context in responses to lower-level microservices.

In cases where the stateless microservice can make a processing decision based strictly on the context, state lookup is avoided. In cases where the stateless microservice can make process decisions based strictly on context and context state (not the service state associated with the microservice processing), this service state lookup is avoided. Any failover of microservices regardless of hierarchy levels or scale may operate under the same benefit.

Figure 9:
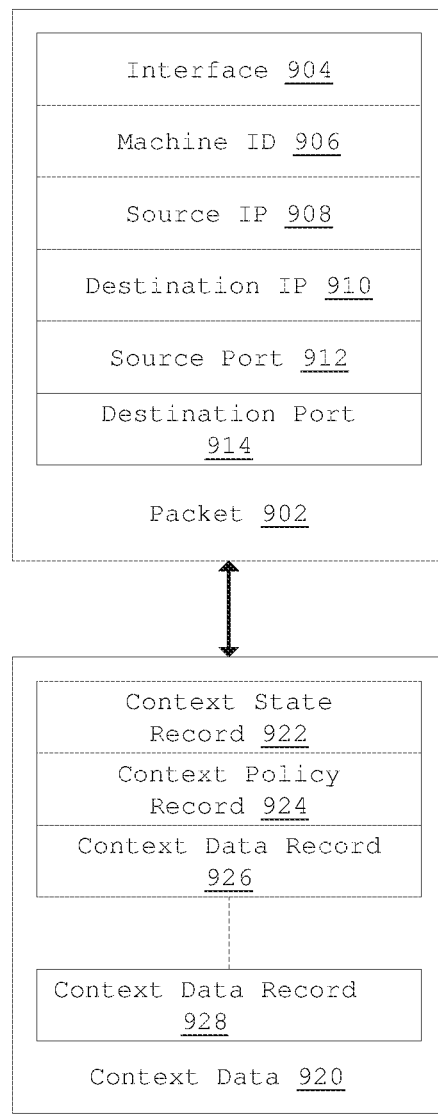
FIG. 9 demonstrates an embodiment of the creation of a context and the data associated with the context throughout processing in a security service architecture.

FIG. 9 illustrates an embodiment of a context and the data associated with the context throughout processing in a security service architecture. Received packet 902 is received by the interface microservice and contains, in some embodiments, one or more of an interface 904, a machine ID 906, a source IP address 908, a destination IP address 910, a source port 912 and a destination port 914. The interface 904 may be a physical interface such as an Ethernet MAC address, a virtual interface such as an interface provided to a virtual machine by a hypervisor or other numeric or textual description of a path associated with the packets being processed. The machine ID 906 may be a description of the source of the packet transmission capable of distinguishing packet sources behind a NAT boundary or firewall. In these cases, the Source IP 908 may be shared by a number of packet sources. Context generation is performed through a lookup of these fields or a subset of these fields. The lookup mechanism may be configurable such that common networks, physical or virtual machines or connection paths may be grouped using, for example, subnets, ranges of IP addresses or other means and processed using the same policy.

Each context includes context data 920 with a state record 922 and policy record 924. Context State Record 922 may be modified by any microservice and may contain information relating to security events identified by microservices and associated with the packet transmissions belonging to the context. An example of such data would be flags identifying use of weak or deprecated encryption protocols, peer-to-peer network traffic or other information identified over the course of providing security services. Context Policy Record 924 contains the information used to instruct the microservices in their processing of security services. The context policy is the minimal record that may be transported as the context field as part of transmissions between microservices. Other fields of Context Data 920 may also be transmitted.

Context Data 920 may also include one or more Context Data Records (926 through 928) contain information related to the processing of security events of specific microservices. Examples of Context Data Records include counters utilized by TCP/IP services to detect out of order packets, counters of ping packets from certain networks or other data or state relevant to specific microservices.

By transmitting a context including context policy record 924 as part of every transmission between microservices, the load on a shared state service may be greatly reduced and scaling of microservices may be accomplished more easily.

In the foregoing specification, specific exemplary embodiments have been disclosed. It will, however, be evident that various modifications and changes may be made thereto without departing from the broader spirit and scope of the invention as set forth in the appended claims. The specification and drawings are, accordingly, to be regarded in an illustrative rather than a restrictive sense.

Although some embodiments disclosed herein involve data handling and distribution in the context of hardware execution units and logic circuits, other embodiments can be accomplished by way of a data or computer-executable instructions stored on a non-transitory machine-readable, tangible medium, which, when performed by a machine, cause the machine to perform functions consistent with at least one embodiment. In one embodiment, functions associated with embodiments of the present disclosure are embodied in computer-executable instructions. The computer-executable instructions can be used to cause a general-purpose or special-purpose processor that is programmed with the instructions to perform the steps of the at least one embodiment. Embodiments of the present invention may be provided as a computer program product or software which may include a machine or computer-readable medium having stored thereon computer-executable instructions which may be used to program a computer (or other electronic devices) to perform one or more operations according to the at least one embodiment. Alternatively, steps of embodiments might be performed by specific hardware components that contain fixed-function logic for performing the steps, or by any combination of programmed computer components and fixed-function hardware components.

Computer-executable instructions used to program logic to perform the at least one embodiment can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

What is claimed is:

1. A method comprising:
    transmitting, by a first microservice, packet data and a context, wherein the context is associated with the packet data;
    receiving, by a second microservice, the packet data and the context, the second microservice to: send a request for a service state to one of a plurality of redundant message services, use the context and the requested service state to determine what security processing to perform, to perform the security processing over the packet data, and to transmit resulting data and the context to a third microservice; and
    receiving, by the third microservice, the resulting data and the context, the third microservice to: use the context to determine what security processing to perform, and to perform the security processing over the resulting data;
    wherein the second microservice to extract data from the packet data, and perform the security processing over the data extracted from the packet data, and wherein the third microservice to extract data from the resulting data, and to perform the security processing over the data extracted from the resulting data;
    wherein the second microservice and the third microservice to extract higher-level data from the received data;
    wherein the second microservice does not maintain a copy of the service state, such that, in case of its failure, a different microservice accesses and uses the service state; and
    wherein the method is performed by a security service comprising a hierarchy of microservices, including, at the lowest level, an interface microservice to generate the context.

2. The method of claim 1, wherein the second microservice and the third microservice to use the context to perform the security processing.

3. The method of claim 1, wherein the second microservice is a transmission control protocol/internet protocol (TCP/IP) microservice, and the third microservice is a deep packet inspection (DPI) microservice.

4. The method of claim 1, wherein the second microservice to use a service state and a context state to perform security processing.

5. The method of claim 4, wherein the second microservice to retrieve the service state and the context state from a state service.

6. The method of claim 4, wherein the second microservice to use the context to perform the security processing and avoid retrieving the service state and the context state from a state service.

7. A system comprising:
    a memory;
    a processor to use the memory and to execute instructions to implement a first security microservice, the first security microservice to perform a process comprising:

transmitting, by a first microservice, packet data and a context associated therewith;

receiving the packet data and the context by a second microservice, the second microservice to: send a request for a service state to one of a plurality of redundant message services, use the context and the requested service state to determine what security processing is requested of the second microservice, to perform the requested security processing over the packet data, and to transmit resulting data and the context to a third microservice; and receiving the resulting data and the context by the third microservice, the third microservice to: use the context to determine what security processing is requested of the third microservice, and to perform the requested security processing over the resulting data;

wherein the second microservice to extract data from the packet data and perform the requested security processing over the data extracted from the packet data, and wherein the third microservice to extract data from the resulting data and perform the requested security processing over the data extracted from the resulting data;

wherein the second microservice and the third microservice to extract higher-level data from the received data;

wherein the second microservice does not maintain a copy of the service state, such that, in case of its failure, a different microservice accesses and uses the service state; and wherein the processor comprise a hierarchy of microservices, including, at the lowest level, an interface microservice to generate the context.

8. The system of claim 7, wherein the second microservice is a transmission control protocol/internet protocol (TCP/IP) microservice, and the third microservice is a deep packet inspection (DPI) microservice.

9. The system of claim 7, wherein the second microservice to use a service state and a context state to perform security processing.

10. The system of claim 9, wherein the second microservice to retrieve the service state and the context state from a state service.

11. The system of claim 7, wherein the second microservice to use the context to perform the security processing and avoid retrieving a service state and a context state from a state service.

12. The system of claim 9, wherein second microservice to use the context to perform the security processing and avoid retrieving the service state and the context state from a state service.

13. A non-transitory computer-readable medium containing computer-executable instructions that, when executed by a processor, cause the processor to:

transmit, by a first microservice, packet data and a context associated therewith;

receive the packet data and the context by a second microservice, the second microservice to: send a request for a service state to one of a plurality of redundant message services, use the context and the requested service state to determine what security processing is requested of the second microservice, perform the requested security processing over the packet data, and transmit resulting data and the context to a third microservice; and receive the resulting data and the context by the third microservice, the third microservice to: use the context to determine what security processing is requested of the third microservice, and perform the requested security processing over the resulting data;

wherein the second microservice to extract data from the packet data and perform security processing over the data extracted from the packet data, and wherein the third microservice to extract data from the resulting data and perform security processing over the data extracted from the resulting data;

wherein the second microservice does not maintain a copy of the service state, such that, in case of its failure, a different microservice accesses and uses the service state; and wherein the computer-executable instructions are to be executed by a security service comprising a hierarchy of microservices, including, at the lowest level, an interface microservice to generate the context.

14. The non-transitory computer-readable medium of claim 13, wherein the second microservice is a transmission control protocol/internet protocol (TCP/IP) microservice, and the third microservice is a deep packet inspection (DPI) microservice.

15. The non-transitory computer-readable medium of claim 13, wherein the second microservice to use a service state and a context state to perform security processing.

16. The non-transitory computer-readable medium of claim 13, wherein second microservice to retrieve a service state and a context state from a state service.

17. The non-transitory computer-readable medium of claim 13, wherein the second microservice to use the context to perform the security processing and avoid retrieving a service state and a context state from a state service.

* * * * *